United States Patent
Lewis et al.

(10) Patent No.: US 12,349,839 B2
(45) Date of Patent: Jul. 8, 2025

(54) SYSTEMS FOR STAND MIXER BOWL LIFTING

(71) Applicant: Haier US Appliance Solutions, Inc., Wilmington, DE (US)

(72) Inventors: Eric Matthew Lewis, Louisville, KY (US); Tomas Garces, Louisville, KY (US); Matthew R. Hunter, Louisville, KY (US); Danister Abeygunawardana, Jefferson, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 628 days.

(21) Appl. No.: 17/704,419

(22) Filed: Mar. 25, 2022

(65) Prior Publication Data
US 2023/0301464 A1    Sep. 28, 2023

(51) Int. Cl.
| | |
|---|---|
| *A47J 43/044* | (2006.01) |
| *A47J 43/07* | (2006.01) |
| *B01F 27/805* | (2022.01) |
| *B01F 101/00* | (2022.01) |

(52) U.S. Cl.
CPC .......... *A47J 43/044* (2013.01); *A47J 43/0727* (2013.01); *B01F 27/805* (2022.01); *A47J 2043/04472* (2013.01); *B01F 2101/1805* (2022.01)

(58) Field of Classification Search
CPC ....................... B01F 27/805; A47J 2043/04472
See application file for complete search history.

(56) References Cited

U.S. PATENT DOCUMENTS

| | | | | |
|---|---|---|---|---|
| 2,020,450 A | * | 11/1935 | Andis ................... | B01F 27/805 366/199 |
| 2,339,439 A | * | 1/1944 | Tone ......................... | A21C 1/02 366/331 |
| 2,345,266 A | * | 3/1944 | Karp ...................... | B01F 35/322 474/26 |
| 2,621,907 A | * | 12/1952 | Maurer .................. | A47J 43/044 366/261 |
| 2,626,133 A | * | 1/1953 | Reed ......................... | A23G 9/28 366/206 |
| 4,500,210 A | * | 2/1985 | Vilen ........................ | A21C 1/02 366/279 |
| 10,799,072 B2 | | 10/2020 | Ambrose et al. | |
| 2007/0195641 A1 | * | 8/2007 | Schnipke .............. | B01F 27/805 366/206 |
| 2009/0185443 A1 | * | 7/2009 | Blackburn .......... | A47J 43/0727 366/261 |

FOREIGN PATENT DOCUMENTS

| | | |
|---|---|---|
| DE | 3912361 A1 | 10/1990 |
| JP | 3219611 U | 1/2019 |
| KR | 101304328 B1 * | 9/2013 |

* cited by examiner

Primary Examiner — Marc C Howell
(74) Attorney, Agent, or Firm — Dority & Manning, P.A.

(57) ABSTRACT

A stand mixer includes a base with a support column, and a bowl lift framework extending outwardly from the support column. The bowl lift framework includes at least two lift arms. The lift arms are pivotable relative to the support column. A head is attached to an upper end of the support column and extends horizontally from the support column above the base. Additionally included is a bowl. The bowl includes a flange around a circumference of the bowl, and the bowl is held between the lift arms of the bowl lift framework.

16 Claims, 4 Drawing Sheets

SYSTEMS FOR STAND MIXER BOWL LIFTING

FIELD OF THE INVENTION

The present subject matter relates generally to stand mixer bowl lifting apparatus.

BACKGROUND OF THE INVENTION

Stand mixers are generally used for performing automated mixing, churning, or kneading involved in food preparation. Typically, stand mixers include a motor configured to provide torque to one or more driveshafts. Users may connect various utensils to the one or more driveshafts, including whisks, spatulas, or the like. When using the stand mixer, the contents of the bowl can become heavy and difficult to move or manage. When this occurs, it is beneficial to use a specialized mixer. One type of specialized mixer, for example, is a tilt-head mixer. The tilt-head mixer is a type of stand mixer that allows the user to tilt the head of the mixer to provide access to the opening of the bowl. Tilt-head mixers may be troublesome as the head of the mixer is typically heavy.

Another type of mixer is the bowl-lift mixer. Bowl-lift mixers are stand mixers that incorporate a bowl that can be lifted vertically by a lift system. Arms extending from the mixer grab the bowl, and a lever, or crank, projecting out of one of the sides of the mixer head, may be spun to translate the mixing bowl up or down. Using a bowl-lift mixer reduces the difficulty of moving the mixing bowl vertically. Although, bowl-lift mixers may take up more counterspace in the kitchen than the tilt-head mixer, as bowl lift mixers typically have a large handle on one side of the mixer.

BRIEF DESCRIPTION OF THE INVENTION

Aspects and advantages of the invention will be set forth in part in the following description, or may be apparent from the description, or may be learned through practice of the invention.

In one example embodiment, a stand mixer includes a base with a support column extending upwardly from the base, and a bowl lift framework extending outwardly from the support column. The bowl lift framework includes at least one lift arm. The lift arm is pivotable relative to the support column. A head is attached to an upper end of the support column and extends from the support column above the base. Additionally included is a bowl. The bowl lift framework is configured for vertically moving the bowl relative to the head when the lift arm pivots relative to the support column. The bowl is held between the lift arm of the bowl lift framework.

In another example embodiment, a stand mixer includes a base with a support column extending upwardly from the base, and a column rail fixed to the support column. A head is attached to an upper end of the support column and extends from the support column above the base. Additionally, a bowl carrier is slidably coupled to the column rail, and at least one lift arm is rotatably mounted to the bowl carrier. A bowl includes at least two flanges. The flanges are on opposite sides of the bowl, and the bowl is held between the lift arm on the bowl carrier. The bowl is removably mountable on the bowl carrier within the lift arm on the bowl carrier. The flanges of the bowl and the bowl carrier are also configured to removably couple.

In another example embodiment, a stand mixer includes a base with a support column extending upwardly from the base, and a column rail fixed to the support column. A bowl lift framework extends outwardly from the column rail of the support column, and a head is attached to an upper end of the support column which extends from the support column above the base. The bowl lift framework includes, a bowl carrier slidably coupled to the column rail, and at least one lift arm rotatably mounted to the bowl carrier. The lift arm is rotatably coupled by a hinge pin. Additionally included is a bowl which includes at least two flanges. The flanges are on opposing sides of the bowl. The bowl is held between the lift arm on the bowl carrier, and the flanges and the bowl carrier are configured to removably couple. The bowl lift framework further includes a ramp block mounted to the bowl carrier. The ramp block includes a slot and a ramp pin, which couples to the lift arms. The ramp pin includes a first position and a second position within the slot. A locking spring is includes such that one end of the locking spring is coupled to the bowl carrier and the other end of the locking spring is coupled to the ramp pin. The locking spring is in tension when the ramp pin is in the first position and second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
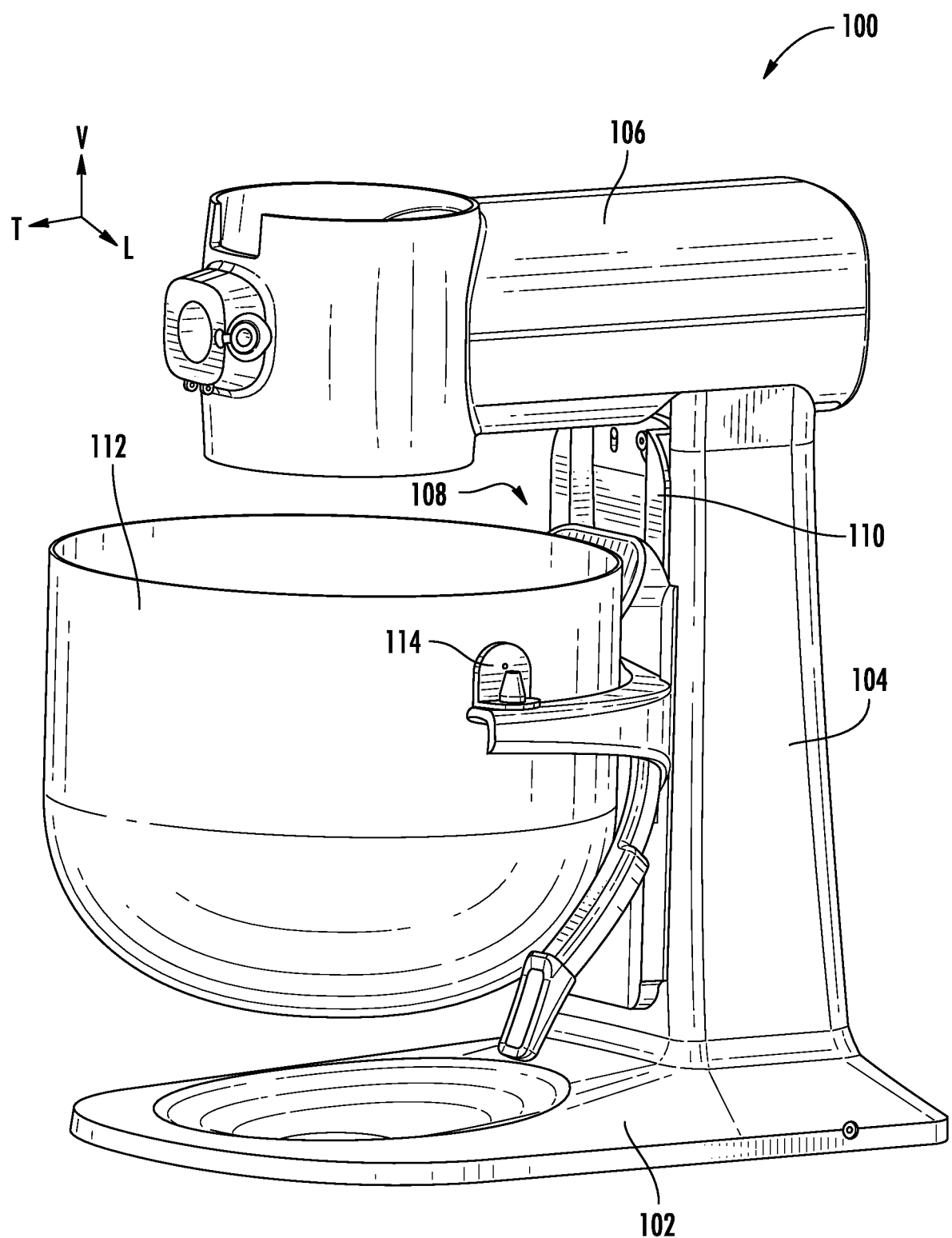
FIG. 1 illustrates an isometric perspective view of an example embodiment of a stand mixer of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides an isometric view of a stand mixer 100 according to an example embodiment of the present subject matter. It will be understood that stand mixer 100 is provided by way of example only and that the present subject matter may be used in or with any suitable stand mixer in alternative example embodiments. Moreover, with reference to each of FIGS. 1 and 2, stand mixer 100 defines a vertical direction V, a lateral direction L, and a transverse direction T, which are mutually perpendicular and form an orthogonal direction system. It should be understood that these directions are presented for example purposes only, and that relative positions and locations of certain aspects of stand mixer 100 may vary according to specific embodiments, spatial placement, or the like.

Stand mixer 100 may include a base 102 and a support column 104. Column 104 may support a mixer head 106, which is positioned atop column 104. Head 106 may house a motor, a gearbox, and/or a drivetrain apparatus (not shown) of stand mixer 100. For example, as shown in FIG. 1, head 106 may be mounted to column 104, which is mounted to base 102. Thus, column 104 may extend between and connect base 102 and head 106, e.g., along the vertical direction V. Head 106 may extend outwardly above the base 102 in the transverse direction T. Column 104 may also include a bowl lift framework 108. Bowl lift framework 108 may slidably mount to a column rail 110, which is mounted to column 104. Additionally, components of bowl lift framework 108 may extend outwardly above the base 102, e.g., in the transverse direction T, and may hold bowl 112 above, vertically, base 102. Bowl 112 may be removably mounted on bowl lift framework 108 via flanges 114. Flanges 114 may be on opposite sides of the bowl 112 with respect to the circumference of the bowl. Bowl lift framework 108 will be described in further detail herein.

Operation of stand mixer 100 is described below. In the operation of stand mixer 100, a user may load food items into bowl 112. The food items may be ingredients such as flours, water, milk, etc. These items are provided for example purposes only and one skilled in the art would appreciate that there are many more types of food items that may be placed in bowl 112 of stand mixer 100. After loading the food items into bowl 112, a user turns on a motor to begin the process of mixing, kneading, beating, etc. The motor rotates an attachment attached to stand mixer 100 to complete each of these processes. The processes may be conducted with a respective attachment such as a mixer blade for mixing, a dough hook for kneading, and a balloon whisk for beating.

Figure 2:
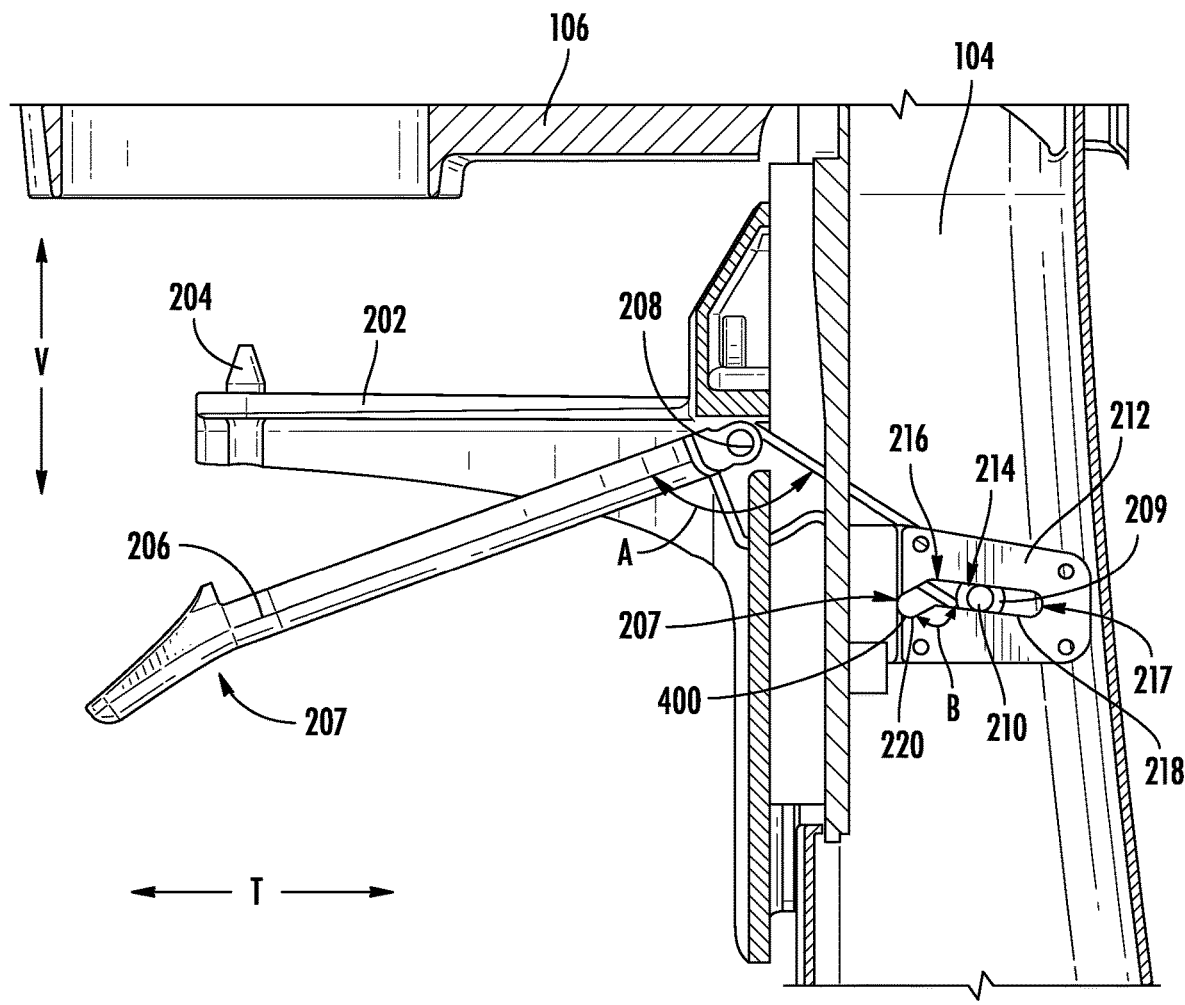
FIG. 2 provides a side, section view of the example stand mixer of FIG. 1.

Shown in a side, section view in FIG. 2, bowl lift framework 108 may include a bowl carrier 202, with a mounting spike 204. Bowl carrier 202 may hold bowl 112 via mounting spike 204, which may removably couple to flanges 114. For instance, each mounting spike 204 on bowl carrier 202 may be received within a respective flange 114 on bowl 112. Lift arm 206 may rotatably couple to bowl carrier 202 via a hinge pin 208. There may be at least two lift arms 206. Thus, bowl 112 may be disposed between lift arms 206, e.g., along the lateral direction L. Each lift arm 206 may be positioned on a respective side of bowl 112, such that both a left-handed user and a right-handed user may comfortably operate lift arms 206. When rotating lift arm 206 about hinge pin 208, a ramp pin 210 may slide along a ramp block 212. Ramp pin 210 may be disposed on an end of lift arm 206, e.g., within support column 104. Ramp pin 210 may slidably couple lift arm 206 to ramp block 212 such that ramp pin 210 may slide within slot 214 defined by ramp block 212.

Lift arm 206 may have one end 207 cantilevered from support column 104. Such distal end 207 may correspond to a handle for a user to grasp, push, or pull. The other end 209 of lift arm 206 may be disposed within support column 104 and may be coupled to ramp block 212. At the hinge point, hinge pin 208 of lift arm 206, both ends 207, 209 of lift arm 206 may linearly extend outward. The hinge point may be disposed within support column 104. The linear portions may be angled between the cantilevered end 207 and the opposite end 209 within support column 104. This angle A formed by the linear portions of lift arm 206 between the cantilevered end 207 and the other end 209, e.g., in a plane perpendicular to the lateral direction L, may be no less than one-hundred degrees (100°) and no more than one-hundred and seventy degrees (170°) in certain example embodiments.

Figure 3:
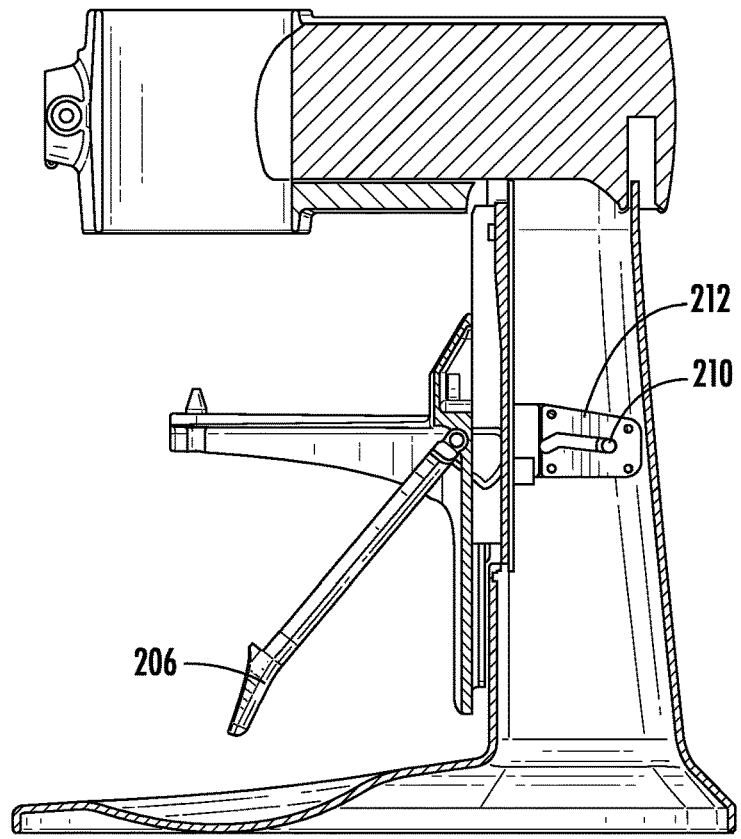
FIG. 3 provides a side, section view of the example stand mixer of FIG. 1 in the lowered position.
Figure 4:
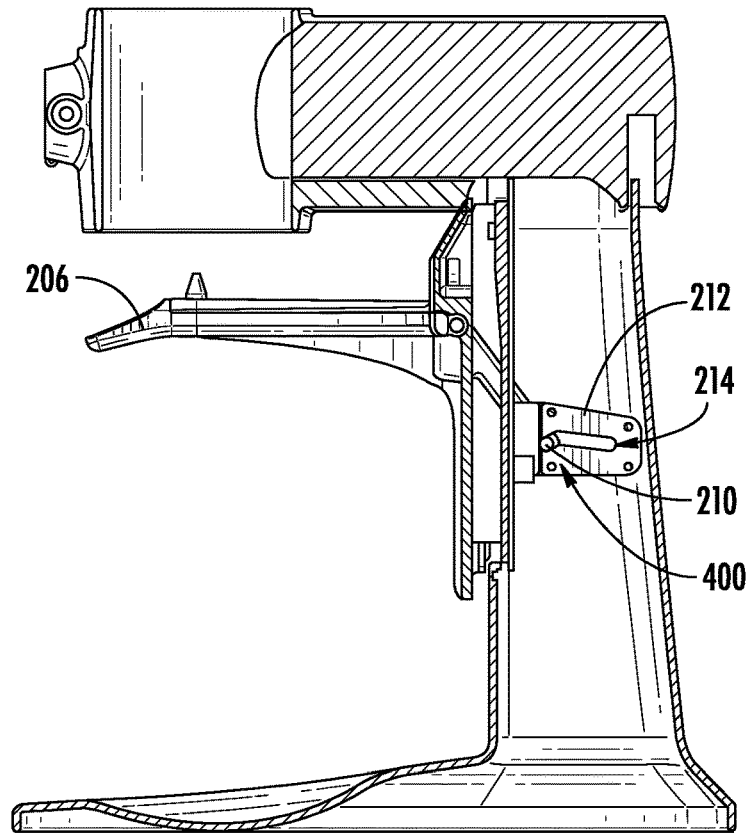
FIG. 4 provides a side, section view of the example stand mixer of FIG. 1 in the raised position.

Referring now to FIGS. 3 and 4, ramp block 212 may define two positions for ramp pin 210. The first position, shown in FIG. 3, includes ramp pin 210 in one end of slot 214, opposite of detent 400 (FIG. 4). In the first position, otherwise called the down position, bowl 112 may be lowered into contact with base 102 of stand mixer 100, or proximate above base 102. In the first position, lift arm 206 is disengaged, angled downward toward base 102. Bowl 112 may be in the first position so that there is more space between bowl 112 and head 106 such that ingredients may be added to the bowl. The second position, otherwise referred to as the up position, includes bowl 112 elevated vertically from base 102 of stand mixer 100 when lift arm 206 is actuated. For example, when lift arm 206 is actuated, a user rotates lift arm 206 to a horizontal position, as seen in FIG. 4, and ramp pin 210 is positioned into detent 400 of slot 214. When bowl 112 is raised vertically, V, from base 102, bowl 112 is positioned closer to head 106 for stand mixer 100 to mix the contents of bowl 112.

Slot 214, for example, may have detent 400 at end 207. Detent 400 defines an angled portion 220 of slot 214 where ramp pin 210 is held in place by angular force provided by the weight of bowl 112 on lift arm 206 through hinge pin 208. When lift arm 206 is rotated, ramp pin 210 overcomes or traverses the highest position 216 in slot 214 to exit detent 400, upon which ramp pin 210 may slide down a declining portion 218 of slot 214 until ramp pin 210 reaches the opposite end 217 of slot 214. The angle B created between angled portion 220 of slot 214 with detent 400 and declining portion 218, e.g., in a plane perpendicular to the lateral direction L, may be no less than one-hundred degrees (100°)

and no more than one-hundred and seventy degrees (170°) in certain example embodiments.

Figure 5:
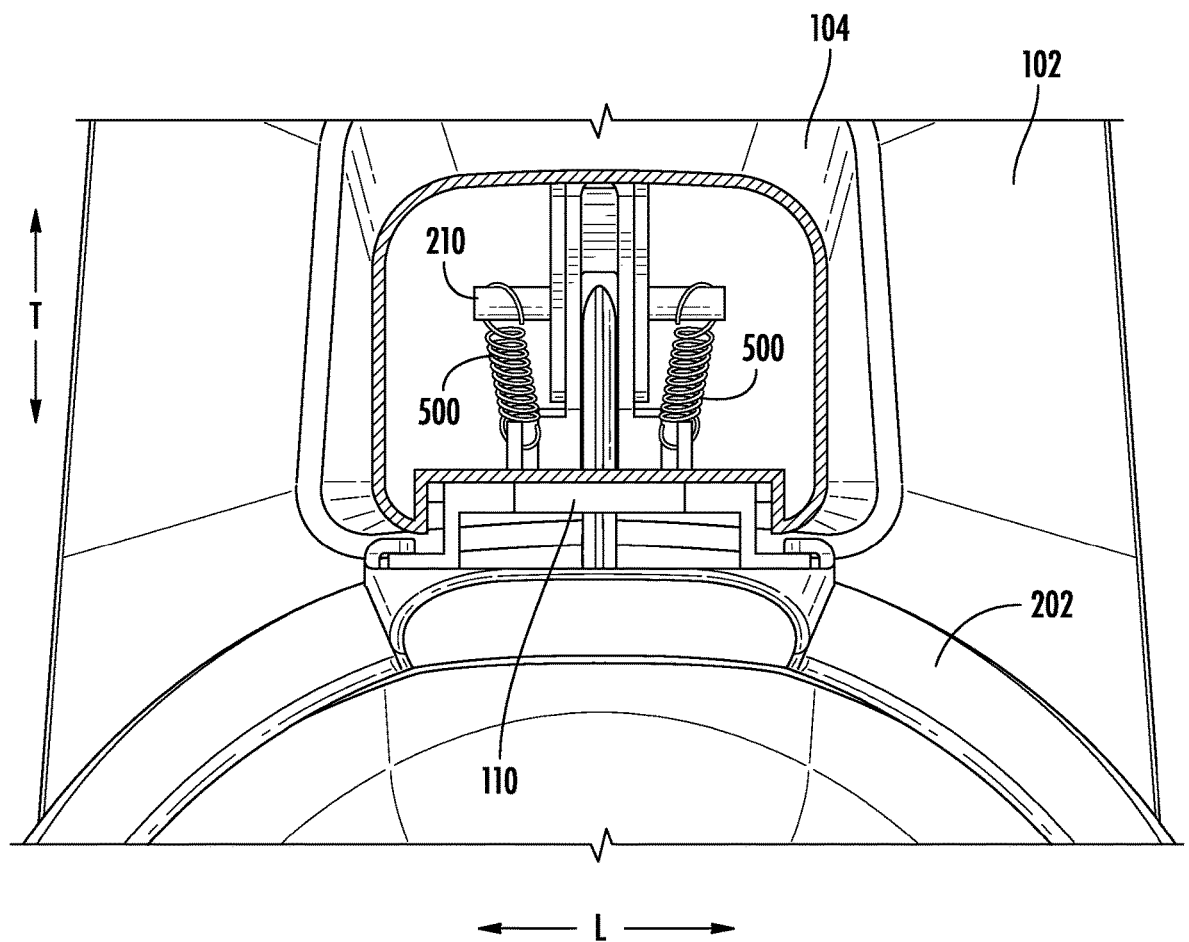
FIG. 5 provides a top section view of an interior of the support column of FIG. 1.

In order to aid rotating lift arm 206 and raising bowl 112 into the second position, locking springs 500, as seen in FIG. 5, may couple to ramp pin 210 and column rail 110. Locking springs 500 may be in tension while ramp pin 210 is in both the first position and the second position. For example, with the assistance from the tension from locking springs 500, lift arm 206 may rotate about an axis that extends generally parallel to the lateral direction L, sliding ramp pin 210, in the transverse direction T, into the second position, and sliding bowl carrier 202 up column rail 110, in the vertical direction V, until ramp pin 210 rests in detent 400. Thus, bowl 112 may be raised vertically, along the vertical direction V, from base 102 and positioned closer to head 106 for stand mixer 100 to start mixing. When bowl 112 is raised into the second position, bowl 112 may be immobilized in all directions by bowl lift framework 108, until lift arm 206 are disengaged from the second position.

As may be seen from the above, stand mixer 100 is a bowl-lift mixer, with lift arm 206 on either side of bowl 112. In the lower position, lift arm 206 are angled downwards. When lift arm 206 are pulled upwards, the bowl lift framework 108 lifts bowl 112 in the vertical direction V. When bowl 112 is in the uppermost position, lift arm 206 may be oriented horizontal. Positioning lift arm 206 around the sides of bowl 112 provides for controlling bowl lift framework 108 from the front and prevents collision with objects behind stand mixer 100. The lift arms 206 positioning also does not require the user to reach over the bowl 112 to actuate. Lift arms 206 may be rotatably attached to bowl carrier 202 via hinge pin 208. Bowl carrier 202 may be slidably mounted to column rails 110 but constrained otherwise. Ramp block 212 may be fixed to column 104, and the rotation of lift arms 206 may be constrained within the geometry of slot 214 of ramp block 212 by ramp pin 210.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer, comprising:
   a base;
   a support column attached to the base and extending upwardly from the base;
   a column rail mounted to the support column;
   a bowl lift framework extending outwardly from the support column, the bowl lift framework comprising at least two lift arms and a bowl carrier slidably mounted on the column rail, the lift arms pivotable relative to the support column;
   a hinge pin about which the lift arms are rotatably coupled to the bowl lift framework;
   a ramp block mounted to the bowl carrier, wherein the ramp block defines a slot, wherein a ramp pin on an end portion of the lift arms is received within the slot of the ramp block, the ramp pin slidable between a first position and a second position within the slot;
   a head attached to an upper end of the support column and extending from the support column above the base; and
   a bowl,
   wherein the bowl lift framework is configured for vertically moving the bowl relative to the head when the lift arm pivots relative to the support column, and the bowl is held between the lift arms of the bowl lift framework.

2. The stand mixer of claim 1, wherein the bowl carrier comprises a mounting spike, a flange of the bowl configured for receiving the mounting spike of the bowl carrier in order to removeable mount the bowl on the bowl carrier.

3. The stand mixer of claim 1, further comprising a locking spring, one end of the locking spring coupled to the bowl carrier and the other end of the locking spring coupled to the ramp pin, the locking spring in tension when the ramp pin is in the first position and the second position.

4. The stand mixer of claim 1, wherein when actuated the bowl lift framework immobilizes the bowl in all directions.

5. The stand mixer of claim 1, wherein the bowl lift framework is adjustable between a down position and an up position by pivoting the lift arm relative to the support column.

6. The stand mixer of claim 5, wherein the bowl is positioned closer to the base in the down position than in the up position.

7. The stand mixer of claim 5, wherein the bowl is suspended vertically over the base in the up position.

8. A stand mixer, comprising:
   a base;
   a support column attached to the base and extending upwardly from the base;
   a column rail mounted to the support column;
   a head attached to an upper end of the support column and extending from the support column above the base;
   a bowl carrier slidably coupled to the column rail;
   at least two lift arms rotatably mounted to the bowl carrier;
   a ramp block mounted to the bowl carrier, wherein the ramp block comprises a slot and a ramp pin which couples the ramp block to the lift arms, wherein the ramp pin comprises a first position and a second position within the slot; and
   a bowl comprising at least two flanges, the flanges positioned on opposite sides of the bowl,
   wherein the bowl is removably mountable on the bowl carrier between the lift arms on the bowl carrier, and
   wherein the flanges of the bowl and the bowl carrier are configured to removably couple.

9. The stand mixer of claim 8, further comprising a hinge pin about which the lift arm is rotatably coupled to the bowl carrier.

10. The stand mixer of claim 8, further comprising a locking spring, one end coupled to the bowl carrier and the other end coupled to the ramp pin, the locking spring in tension when the ramp pin is in the first position and the second position.

11. The stand mixer of claim 10, wherein when the lift arm is actuated the bowl carrier immobilizes the bowl in all directions.

12. The stand mixer of claim 11, further comprising two positions, a down position and an up position.

13. The stand mixer of claim 12, wherein the bowl is positioned closer to the base in the down position than in the up position.

14. The stand mixer of claim 12, wherein the lift arm is actuated, and the ramp pin is in a detent of the slot, the bowl is elevated vertically from the base of the stand mixer.

15. A stand mixer, comprising:
a base;
a support column attached to the base and extending upwardly from the base;
a column rail fixed to the support column;
a bowl lift framework extending outwardly from the column rail of the support column; and
a head attached to an upper end of the support column and extending horizontally from the support column above the base,
wherein the bowl lift framework further comprises,
   a bowl carrier slidably coupled to the column rail;
   at least two lift arms rotatably mounted to the bowl carrier, the lift arms rotatably coupled by a hinge pin; and
   a bowl comprising at least two of a flange, the flange on opposing sides of the bowl, the bowl held between the lift arms on the bowl carrier, the flange of the bowl and the bowl carrier are configured to removably couple,
   a ramp block mounted to the bowl carrier, the ramp block comprising a slot and a ramp pin which couples to the lift arms, the ramp pin comprises a first position and a second position within the slot, and
   a locking spring, one end of the locking spring is coupled to the bowl carrier and the other end of the locking spring is coupled to the ramp pin, the locking spring is in tension when the ramp pin is in the first position and second position.

16. The stand mixer of claim 15, wherein the stand mixer comprises two positions, a down position and an up position.

\* \* \* \* \*